(12) United States Patent
Rehfeld et al.

(10) Patent No.: US 7,892,629 B2
(45) Date of Patent: Feb. 22, 2011

(54) LAMINATED GLAZING MATERIAL

(75) Inventors: Marc M. Rehfeld, Ezanville (FR); Boris M. Vidal, Luanco (ES)

(73) Assignee: Saint-Gobain Glass France, Courbevoie (FR)

( * ) Notice: Subject to any disclaimer, the term of this patent is extended or adjusted under 35 U.S.C. 154(b) by 1018 days.

(21) Appl. No.: 11/283,869

(22) Filed: Nov. 22, 2005

(65) Prior Publication Data

US 2006/0070694 A1 Apr. 6, 2006

Related U.S. Application Data

(62) Division of application No. 09/847,395, filed on May 3, 2001, now abandoned.

(30) Foreign Application Priority Data

May 3, 2000 (FR) .................................. 00 05617

(51) Int. Cl.
B32B 27/00 (2006.01)
(52) U.S. Cl. .................... 428/212; 428/426; 428/411.1; 428/437; 156/64; 156/99
(58) Field of Classification Search ................. 428/212, 428/215, 426, 213, 411.1, 415, 437; 156/64; 156/99; 73/760
See application file for complete search history.

(56) References Cited

U.S. PATENT DOCUMENTS

| | | | |
|---|---|---|---|
| 4,614,676 A | 9/1986 | Rehfeld | |
| 5,368,917 A | 11/1994 | Rehfeld et al. | |
| 5,478,615 A | 12/1995 | Rehfeld et al. | |
| 5,598,669 A | 2/1997 | Hamdi et al. | |
| 5,759,220 A | 6/1998 | Boaz | |
| 5,763,089 A | 6/1998 | Chaussade et al. | |
| 5,773,102 A * | 6/1998 | Rehfeld | 428/34 |
| 5,908,704 A | 6/1999 | Friedman et al. | |
| 6,001,462 A | 12/1999 | Purvis et al. | |
| 6,074,732 A | 6/2000 | Garnier et al. | |

FOREIGN PATENT DOCUMENTS

| | | |
|---|---|---|
| CN | 1124017 A | 6/1996 |
| CN | 1142437 A | 2/1997 |
| CN | 1179130 A | 4/1998 |
| CN | 1311735 A | 9/2001 |
| EP | 0 100 701 | 2/1984 |
| EP | 0 747 210 A2 | 12/1996 |
| EP | 0 783 420 | 7/1997 |
| EP | 0 842 767 A1 | 5/1998 |
| EP | 0844075 A1 | 5/1998 |
| EP | 1 112 180 B1 | 1/2005 |
| JP | 03-124440 A | 5/1991 |
| JP | 09-165235 A | 6/1997 |
| JP | 10-177390 A | 6/1998 |
| JP | 2001-505149 A | 4/2001 |
| WO | WO 99/00247 | 1/1999 |

OTHER PUBLICATIONS

Arkhireyeva et al., "Effect of temperature on fracture properties of an amorphous poly(ethylene terephthalate) (PET) film," Journal of Materials Science, vol. 37, pp. 3675-3683, 2002.
Tielking, "A Fracture Toughness Test for Polymer Film," Polymer Testing, vol. 12, pp. 207-220, 1993.
Hashemi et al., "A fracture toughness study on low density and linear low density polyethylenes," Polymer, vol. 27, pp. 384-392, 1986.
Kaprov et al., "Mechanical Strength of Thin Triplex Automobile Glass," All-Union Scientific Research Institute of Technical and Structural Glass, Translated from Steklo I Keramika, No. 4, pp. 15-16, Apr. 1982.
"Plastics-Determination of tensile properties of films", Chinese Standard GB 13022-91 , Jul. 3, 1991.
Extract of a book in Chinese from Gaodeng Xuexiao Jiaoxue Yongshue concerning mechanical properties metals , 1988.
U.S. Appl. No. 12/770,821, filed Apr. 30, 2010, Rehfeld, et al.

* cited by examiner

*Primary Examiner*—David R Sample
*Assistant Examiner*—Lawrence D Ferguson
(74) *Attorney, Agent, or Firm*—Oblon, Spivak, McClelland, Maier & Neustadt, L.L.P.

(57) ABSTRACT

A laminated glazing material with properties of acoustic insulation and mechanical strength. The laminated glazing material including two glass sheets and a single-ply intermediate layer of a thickness having the form of a polymer film. The thickness of the intermediate layer being defined as a function of a variable which is specific to the material, and which defines the critical energy value of the intermediate layer and is representative of the energy necessary for propagation of a crack initiated in the intermediate layer.

8 Claims, 3 Drawing Sheets

LAMINATED GLAZING MATERIAL

BACKGROUND OF THE INVENTION

1. Field of the Invention

The present invention relates to a laminated glazing material with properties of acoustic insulation and mechanical strength.

2. Discussion of the Background

Laminated glazing materials are generally designed for use in vehicles and buildings to reduce the audibility of external noises within the interior. Laminated glazing materials also have major advantages in terms of their mechanical strength. In fact, in the event of an impact, an intermediate layer of a laminated glazing material advantageously permits part of the impact energy to be absorbed by viscous dissipation before the glass breaks. The function of the intermediate layer is also extremely important since it ensures that the structure will be largely preserved if the glass is completely cracked by virtue of adhesion of glass fragments to the film. Thus, the intermediate layer prevents projection of glass splinters, and consequent injury to persons in the vicinity of the broken glass.

Laminated glazing materials are commonly constructed using polyvinyl butyral (PVB) due to the mechanical performances of this material. Nevertheless, PVB has poor acoustic characteristics. Accordingly, special resins are sometimes preferred for their improved acoustic performances.

The choice of resin for laminated glass constitutes an important criterion for sound insulation of the glazing material. This choice can be made using a method for determining the critical frequency of the laminated glass and comparing the result with the critical frequency of a glass bar. Such a method is described in European Patent EP-B-0 100 701. In this patent a resin is considered to be suitable if a bar of 9 cm length and 3 cm width made of laminated glass including two glass sheets of 4 mm thickness joined by a 2 mm layer of the resin has a critical frequency which differs at most by 35% from that of a glass bar of 4 mm thickness having the same length and the same width.

However, resins with high acoustic performances do not always have the mechanical properties necessary for the conditions in which the laminated glass will be utilized.

For the purpose of combining both acoustic and mechanical properties, European Patent EP-B-0 783 420 proposes the combination of a polyvinyl butyral film with a resin film having acoustic performances. The combination of two separate films, however, leads to higher product costs and to an increase in the cost of producing the glazing material. In fact, the combination of multiple plies of material for the intermediate layer does not allow each material to be recycled individually from the surplus generally produced at the end of the manufacturing line, whereas the recycling operation can be readily employed to optimize production profitability when the intermediate layer is constructed of a single ply.

SUMMARY OF THE INVENTION

In an effort to eliminate these disadvantages, the inventors have constructed a laminated glazing material with properties of mechanical strength and acoustic insulation.

The present invention advantageously provides, by appropriate choice of the material of the intermediate layer, a monolithic laminated glazing material, meaning that the intermediate layer thereof comprises a single ply, with properties of acoustic insulation and properties of mechanical strength conforming with those expected as regards safety in glazing materials for buildings or motor vehicles.

To this end, the invention provides, according, to a first embodiment, a method of appraising criteria for choice of the material and of the thickness of the intermediate layer, which must have a minimum thickness in order to ensure sufficient mechanical strength.

According to the invention, the laminated glazing material or the polymer film that must function as the intermediate layer in a laminated glazing material is characterized in that the intermediate layer has a thickness equal to at least $d_{ref} J_{ref}/J_{c1}$ where $J_c$ is the critical energy value specific to the material of the intermediate layer and representative of the energy necessary for propagation of a crack initiated in the intermediate layer; $J_{ref}$ is a reference critical energy value which corresponds to the critical energy value of a polyvinyl butyral film (PVB) and is equal to 35,100 J/m² for a temperature of 20° C. and for a drawing rate of 100 mm/min applied to the PVB film; and $d_{ref}$ is a reference thickness which corresponds to that of the PVB film and is equal to 0.38 mm.

According to one characteristic, the glazing material is acoustically satisfactory when it meets improved acoustic property criteria defined by the fact that a bar of 9 cm length and 3 cm width, made of laminated glass comprising two glass sheets of 4 mm thickness joined by the 2 mm thick intermediate layer, has a critical frequency which differs at most by 35% from that of a glass bar having the same length, the same width and a thickness of 4 mm.

In addition, the process according to the invention for evaluating the tearing strength of a polymer film of thickness $d_1$, intended to constitute the intermediate layer of a laminated glazing material, is characterized in that: the critical energy value $J_c$ of the intermediate layer is determined, this value being representative of the energy necessary for propagation of a crack initiated in the intermediate layer; the critical energy value $\tilde{J}_c$, relative to the thickness, as defined by the relationship $\tilde{J}_c = J_c \, d_1$, is calculated; $\tilde{J}_c$ is compared with a reference value $\tilde{J}_{ref}$, which is representative of a PVB film of 0.38 mm thickness and is equal to 13.3 J/m; the intermediate layer satisfying the tearing strength criterion when $\tilde{J}_c > \tilde{J}_{ref}$.

According to a second embodiment, which is not based on the thickness that the film must have to achieve mechanical strength, the single-ply intermediate layer is characterized in that its material is composite, comprising in particular a polymer and reinforcing fibers embedded in the polymer.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
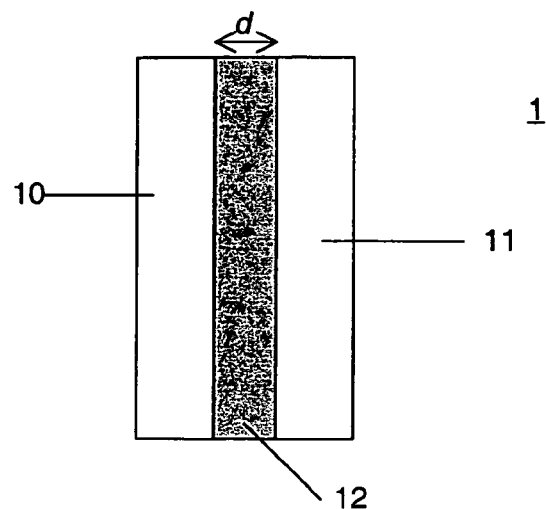
FIG. 1 is a cross-sectional view of a laminated glazing material provided with a single intermediate film according to an embodiment of the present invention.

FIG. 1 depicts a laminated glazing material according to the present invention. The laminated glazing material includes two glass sheets 10 and 11, and an intermediate polymer film 12. The glass sheets 10 and 11 have, for example, a thickness of 6 and 4 mm respectively, while the thickness d of the intermediate layer 12 can be variable. The thickness d is chosen based upon the type of material chosen to construct the intermediate layer 12.

The thickness d that is established for the intermediate layer 12 depends upon the tearing strength of the material used to construct the intermediate layer. The tearing strength is specific to each material, and is characterized by an energy value representative of the energy necessary for propagation of a crack initiated in the material. This energy value, known as critical energy $J_c$ (expressed in $J/m^2$), is different for each type of material and is independent of the film thickness.

The tearing strength of the material, which will therefore be identified directly in terms of the critical energy $J_c$, is evaluated only after appraisal of the acoustic performance of the material. In fact, the present invention preferably first selects a material which is adequate in regards to satisfying the criteria of acoustic insulation, and then secondarily tests the tearing strength performance of the selected material in order to deduce therefrom the thickness d necessary to satisfy the mechanical strength criteria.

To meet the acoustic performance criteria, the intermediate layer must satisfy the critical frequency condition formulated in European Patent EP-B-0 100 701. The principle of measurement of the critical frequency of the intermediate layer includes performing an analysis of the vibration frequencies of two bars subjected to an impact, one bar being a glass bar of 9 cm length and 3 cm width and the other bar being a laminated glass bar of the same dimensions and including two glass sheets of 4 mm thickness plus the intermediate layer of thickness $d_1$ equal, for example, to 2 mm. It is necessary to record the position of the respective resonance frequencies of the two bars and to compare the two resonance frequencies with one another. The material constituting the intermediate layer is appropriate when its resonance frequency differs by less than 35% from that of the glass.

As an alternative embodiment, European Patent Application EP 0 844 075 proposes a different selection technique for the choice of an acoustically satisfactory intermediate layer. In this case the elastic component (or shear modulus) G' and the loss angle tangent (or loss factor) tan δ of the material are evaluated by means of an instrument known as a viscoanalyzer.

The viscoanalyzer is configured to subject a material specimen to deformation loads under precise temperature and frequency conditions, and in this way to obtain and process all of the rheological variables that characterize the material. The raw data including the force, displacement and phase shift measurements as a function of frequency at each temperature allows the values of the shear modulus G' and loss angle tangent tan δ to be calculated. It has been shown that a good acoustic intermediate layer has a loss factor tan δ greater than 0.6 and a shear modulus G' of between $1\times10^6$ and $2\times10^7$ N/m² in a temperature range of between 10 and 60° C. and in a frequency range of between 50 and 10,000 Hz.

Once the material of the intermediate layer has been chosen by virtue of its acoustic performance, it is necessary to determine the material's mechanical strength as expressed by the tearing resistance. For this purpose, the intermediate layer of thickness $d_1$ being used is subjected to a tearing test, which we shall explain later in combination with a method for calculating the critical energy value $J_c$.

After evaluation of the critical energy value $J_c$ specific to the chosen material, the critical energy $\tilde{J}_c$ of the intermediate layer relative to the thickness $d_1$ (expressed in J/m) is calculated from the formula $\tilde{J}_c = J_c \cdot d_1$. This value $\tilde{J}_c$ is then compared with a reference value $\tilde{J}_{ref}$, which corresponds to a material that perfectly satisfies the mechanical strength criteria in terms of safety for a reference thickness $d_{ref}$. The reference material is polyvinyl butyral (PVB) with reference thickness $d_{ref}$ equal to 0.38 mm.

If the comparison result satisfies the rule $\tilde{J}_c \geq \tilde{J}_{ref}$, then the chosen intermediate layer of thickness $d_1$ is suitable.

Otherwise the chosen intermediate layer is given a thickness d such that it is at least equal to $d_{ref} \cdot J_{ref}/J_c$ in order to satisfy the minimum mechanical strength criterion.

The tearing strength or critical energy $J_c$ is given in a known manner by an energy method based on the Rice integral J, which defines the energy localized at the tip of a crack in a film subjected to extremely intense stresses at the cracking location. In simplified mathematical form, it is written as (1): $J = 1/d_1 (\Delta U/\Delta a)$, for a given drawing increment or pull length δ of the specimen under test, to be referred to hereinafter as displacement δ, and where $d_1$ is the specimen thickness, a is the crack size, and U is the potential energy of the specimen.

The method advanced below far calculating the crack tip (or root) energy J is that developed by Tielking.

Figure 2:
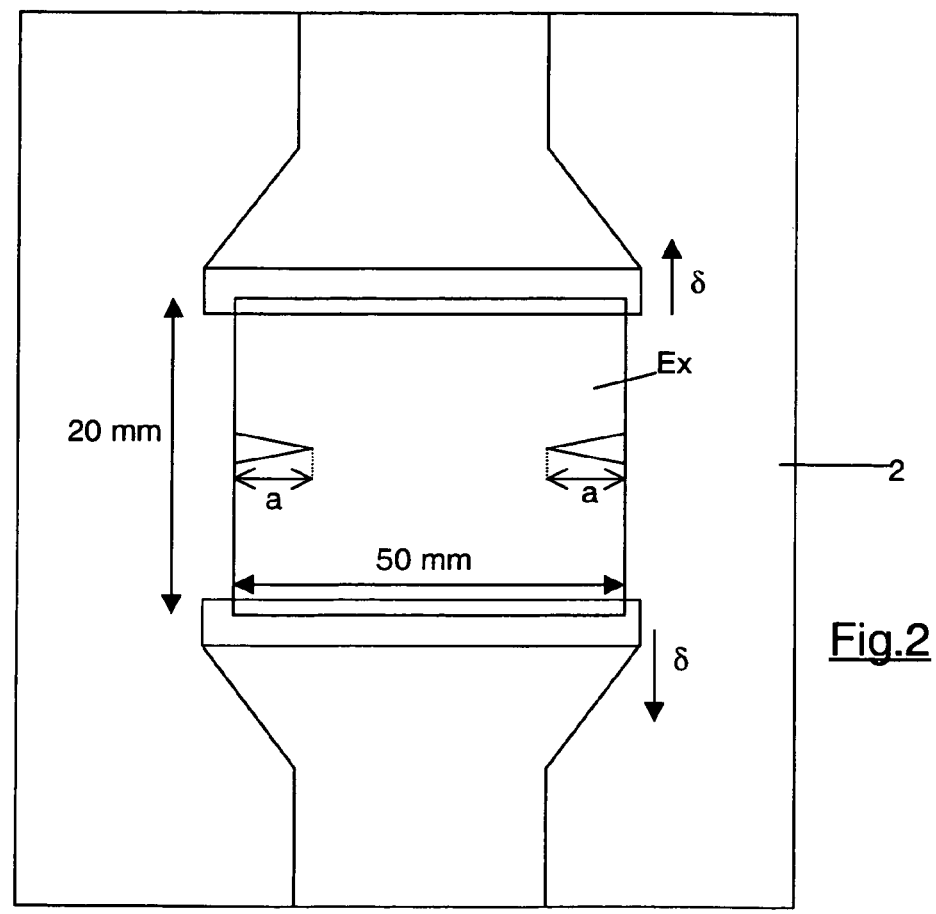
FIG. 2 is a schematic view of a testing device for evaluating the tearing strength of the intermediate layer.

The experimental device as illustrated in FIG. 2 is described below.

Tensile tests by means of a tension-compression machine 2 are performed on several specimens, for example, four specimens $Ex_1$ to $Ex_4$ of the same material and of identical surface area equal to 100 mm² (50 mm long by 20 mm wide). Each specimen is notched on its sides at reference symbol 20 in a manner perpendicular to the tensile force, the crack length a being different for each specimen $Ex_1$ to $Ex_4$ and corresponding to 5, 8, 12 and 15 mm respectively.

Each specimen Ex is drawn or pulled perpendicular to cracks 20 at a drawing rate of 700 mm/min and over a given drawing length or distance δ.

Using this method it is possible to plot a curve (see FIG. 3) of evolution of the crack tip energy J as a function of the drawing increment or displacement δ undergone by the specimen. And by virtue of this curve, it is possible to determine the critical energy J of initiation of tearing of the specimen. It is therefore at the critical value $J_c$ that the material tears and is consequently mechanically damaged.

Figure 3:
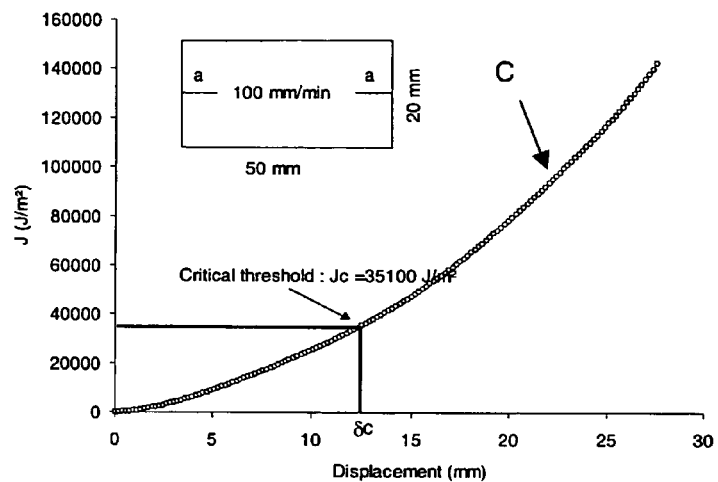
FIG. 3 is a graphic representation of the evolution of the crack tip energy of a crack made in the intermediate layer.

Curve C depicted in FIG. 3 is obtained following the steps explained in detail below. The specimens are polyvinyl butyral films having a thickness of 0.38 mm.

The first step is to plot a curve C1 for each of the specimens $Ex_1$ to $Ex_4$ (see FIG. 4), which represent the tensile force exerted on the specimen as a function of the drawing distance δ undergone by the specimen. The drawing distance δ preferably ranges from 0 to 40 mm.

Figure 4:
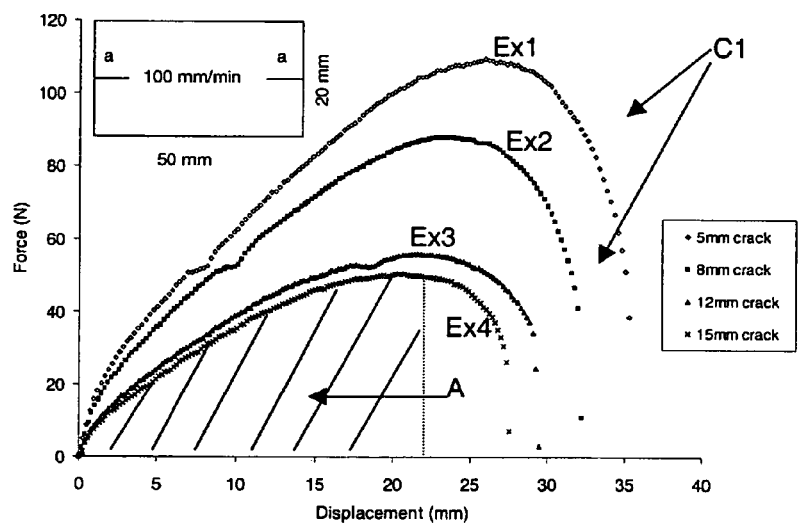
FIG. 4 is a graphic representation of the tensile force exerted on the intermediate layer as a function of the drawing distance of the intermediate layer.

By virtue of the curves C1 of the specimens, the potential energy U corresponding to a given displacement δ is then deduced as a function of the size a to which the crack has grown relative to its initial size. The measurement of the potential energy U is obtained by calculating the area A, which in FIG. 4 is equivalent to the shaded region under curve C1 between 0 mm and the given displacement δ, which in this case is 22 mm for the shaded region and corresponds to specimen $Ex_4$.

Figure 5:
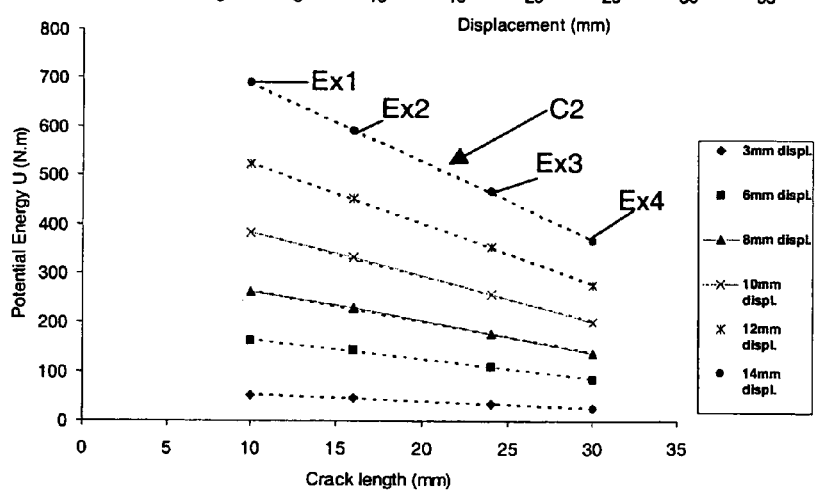
FIG. 5 is a graphic representation of the potential energy of the intermediate layer as a function of the drawing distance of the intermediate layer.

Eight displacements δ ranging from 3 mm to 22 mm were considered. For each of the eight displacements it is then possible to plot a curve C2, as illustrated in FIG. 5, and which represents the potential energy as a function of the size a to which the crack has grown.

Curve C2, which is representative of the potential energy U, is a straight line. Consequently, the derivative (ΔU/Δa) of energy J formulated in equation (1) is actually the slope of line C2 and therefore equal to a constant. The value of J is calculated by dividing this constant by the thickness $d_1$ of the specimen.

After calculation of each of the slopes corresponding to the eight displacements, curve C is plotted (see FIG. 3), which is representative of the energy J as a function of the displacement δ.

By means of a video camera which displays the propagation of the crack 20, it is possible to detect the displacement $δ_c$ at which tearing of the specimen begins. By means of curve C, the corresponding value of the critical energy $J_c$ is then deduced from this displacement $δ_c$.

This method has been applied, as an example, to the mechanically satisfactory PVB film constituting the reference film of 0.38 mm thickness. Tearing occurred for a displacement $δ_c$ of 12 mm, from which it may be conclude that the critical energy value $J_c$ is equal to 35,100 J/m², under experimental conditions where the temperature was 20° C. and the drawing rate was 100 mm/min.

This critical value $J_c$ of 35,100 J/m² for PVB constitutes the reference energy value $J_{ref}$ above which any energy value calculated far another material and according to the method explained hereinabove will be regarded as correct, to the effect that this material is capable of satisfying the mechanical strength criteria.

The chosen acoustically satisfactory material is subjected to the same tearing strength test explained hereinabove in order to calculate its specific critical energy value $J_c$. Thereafter, as already explained hereinabove, its critical energy $\tilde{J}_c$ ($J_c d_1$) relative to its thickness is calculated in order to compare it with the PVB reference value, or in other words $\tilde{J}_{ref}=J_{ref}\times0.38=35,1000\times0.38=13.3$ J/m, and to deduce therefrom the adequate thickness d when the thickness $d_1$ is insufficient.

Figure 6:
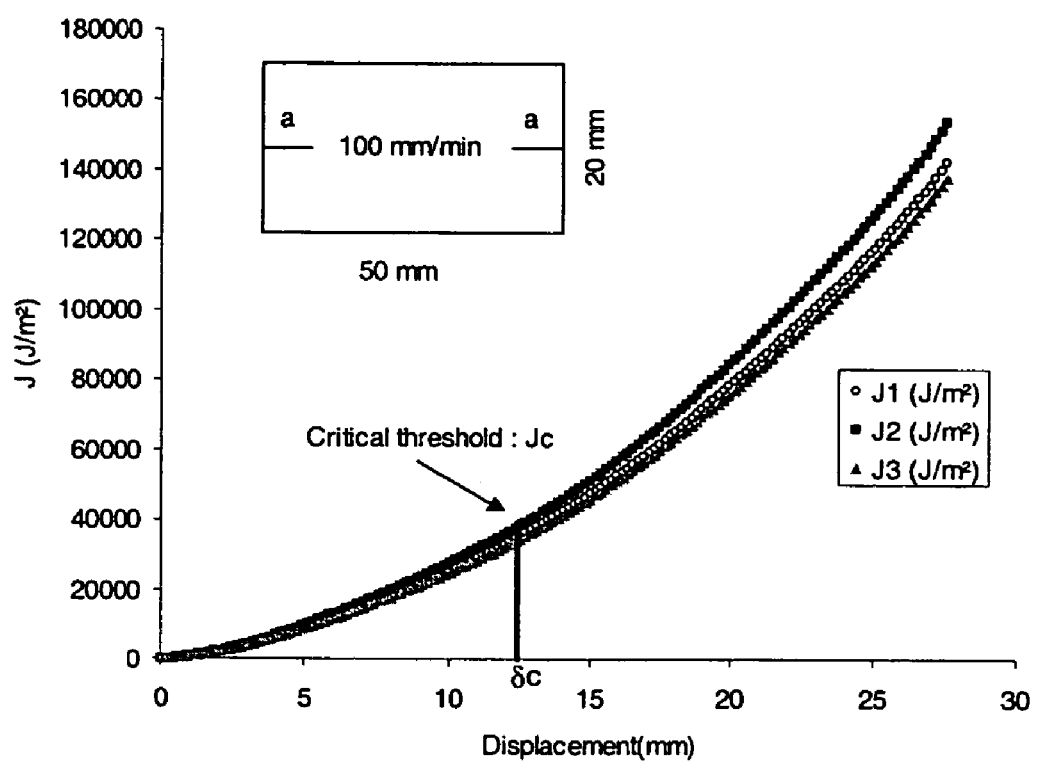
FIG. 6 illustrates the satisfactory reproducibility of a tearing test.

It is noteworthy that, by virtue of its ease of use, the Tielking method will be preferred to other methods, such as that of Hashemi. In addition, it is reliable, since it is reproducible with a mean error of 8% in terms of the overall variation of the energy J as a function of the displacement. FIG. 6 illustrates a series of three tests similar to that developed hereinabove on the change in the energy J as a function of the displacement δ.

According to a second embodiment, which is not based necessarily on the thickness that the film must have to achieve mechanical strength, the single-ply intermediate layer found to be acoustically correct by testing also resists tearing by virtue of the composition of its material. The material is a composite and includes in particular a polymer and reinforcing fibers such as glass fibers embedded in the polymer.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for manufacturing a monolayer interlayer to be inserted in a laminated glazing with acoustic insulation and mechanical strength properties, said glazing comprising two glass sheets and the monolayer interlayer in the form of a polymeric film, the method comprising:

selecting a material for the monolayer interlayer for its acoustic insulation properties, such that said monolayer interlayer material satisfies acoustic insulation properties when a critical frequency of a reference bar 9 cm long and 3 cm wide, consisting of a laminated glass comprising two glass sheets 4 mm thick joined by the interlayer with a reference thickness of 2 mm, is compared to a critical frequency of a glass bar having a same length and same width as the reference bar and a 4 mm thickness, and the critical frequency of the reference bar differs by at most 35% from that of the glass bar;

measuring a $J_c$ critical energy value specific to the selected material of the monolayer interlayer and representative of an energy needed to propagate a crack initiated in the monolayer interlayer; and manufacturing the monolayer interlayer with a thickness such that it satisfies mechanical strength criteria when its thickness is equal to at least $d_{ref}J_{ref}/J_c$, where $J_{ref}$ is a critical reference energy which corresponds to a critical energy of a film of polyvinyl butyral (PVB) and is equal to 35,100 J/m² for a temperature of 20° C. and for a pull rate on the PVB film of 100 mm/min applied to the PVB film, and $d_{reg}$ is a reference thickness which corresponds to that of the PVB film and is equal to 0.38 mM.

2. The method according to claim 1, wherein the $J_c$ critical energy value is measured using a tension-compression machine.

3. A method for manufacturing a monolayer interlayer to be inserted in a laminated glazing with acoustic insulation and mechanical strength properties, said glazing comprising two glass sheets and the monolayer interlayer in the form of a polymeric film, the method comprising:

choosing a material for the monolayer interlayer for its acoustic insulation properties, such that said monolayer interlayer satisfies acoustic insulation properties when the interlayer has a loss factor tan δ greater than 0.6 and a shear modulus G' between $1\times10^6$ and $2\times10^7$ N/m², in a temperature range between 10 and 60° C. and a frequency range between 50 and 10,000 Hz;

measuring a $J_c$ critical energy value specific to the selected material of the monolayer interlayer and representative of an energy needed to propagate a crack initiated in the interlayer; and manufacturing the monolayer interlayer with a thickness such that it satisfies mechanical strength criteria when its thickness is equal to at least $d_{ref}J_{ref}/J_c$, where $J_{ref}$ is a critical reference energy which corresponds to a critical energy of a film of polyvinyl butyral (PVB) and is equal to 35,100 J/m² for a temperature of 20° C. and for a pull rate on the PVB film of 100 mm/min applied to the PVB film, and $d_{ref}$ is a reference thickness which corresponds to that of the PVB film and is equal to 0.38 mM.

4. The method according to claim 3, wherein the $J_c$ critical energy value is measured using a tension-compression machine.

5. The method according to claim 3, wherein the loss factor tan δ is measured using a viscoanalyzer.

6. The method according to claim 3, wherein the shear modulus G' is measured using a viscoanalyzer.

7. A method for manufacturing a laminated glazing comprising the steps of:
- providing a first glass sheet;
- providing a second glass sheet;
- providing a monolayer interlayer in the form of a polymeric film such that said monolayer interlayer material satisfies acoustic insulation properties when a critical frequency of a reference bar 9 cm long and 3 cm wide, consisting of a laminated glass comprising two glass sheets 4 mm thick joined by the monolayer interlayer with a reference thickness of 2 mm, is compared to a critical frequency of a glass bar having a same length and same width as the reference bar and a 4 mm thickness, and the has a critical frequency of the reference bar differs by at most 35% from that of the glass bar, and a thickness of said monolayer interlayer is equal to at least $d_{ref}J_{ref}/J_c$, where $J_c$ is a critical energy value of the monolayer interlayer and represents an amount of energy needed to propagate a crack initiated in the monolayer interlayer, $J_{ref}$ is a critical reference energy which corresponds to a critical energy of a film of polyvinyl butyral and is equal to 35,100 J/m$^2$ for a temperature of 20° C. and for a pull rate on the polyvinyl butyral film of 100 mm/min applied to the polyvinyl butyral film, and $d_{ref}$ is a reference thickness which corresponds to that of the polyvinyl butyral film and is equal to 0.38 mm; and
- joining together said monolayer interlayer between said first and second glass sheets so as to form a laminated glazing with a single interlayer.

8. A method for manufacturing a laminated glazing comprising the steps of:
- providing a first glass sheet;
- providing a second glass sheet;
- providing a monolayer interlayer in the form of a polymeric film such that said monolayer interlayer material satisfies acoustic insulation properties when the interlayer has a loss factor tan δ greater than 0.6 and a shear modulus G' between $1\times10^6$ and $2\times10^7$ N/m$^2$, in a temperature range between 10 and 60° C. and a frequency range between 50 and 10,000 Hz, and a thickness of said monolayer interlayer is equal to at least $d_{ref}J_{ref}/J_c$, where $J_c$ is a critical energy value of the monolayer interlayer and represents an amount of energy needed to propagate a crack initiated in the monolayer interlayer, $J_{ref}$ is a critical reference energy which corresponds to a critical energy of a film of polyvinyl butyral and is equal to 35,100 J/m$^2$ for a temperature of 20° C. and for a pull rate on the polyvinyl butyral film of 100 mm/min applied to the polyvinyl butyral film, and $d_{ref}$ is a reference thickness which corresponds to that of the polyvinyl butyral film and is equal to 0.38 mm; and
- joining together said monolayer interlayer between said first and second glass sheets so as to form a laminated glazing with a single interlayer.

* * * * *